(12) United States Patent
Dawson (10) Patent No.: US 6,192,936 B1
(45) Date of Patent: Feb. 27, 2001

(54) HYDRAULIC CONTROL MEANS

(75) Inventor: Clive Dawson, Waterlooville (GB)

(73) Assignee: Aeroquip-Vickers Limited, Havant Hants (GB)

( * ) Notice: Subject to any disclaimer, the term of this patent is extended or adjusted under 35 U.S.C. 154(b) by 0 days.

(21) Appl. No.: 09/271,000

(22) Filed: Mar. 17, 1999

(30) Foreign Application Priority Data

Mar. 20, 1998 (GB) .................................................. 9805883

(51) Int. Cl.[7] .......................... F15B 13/042; F15B 13/08; F15B 13/16
(52) U.S. Cl. ...................... 137/625.6; 91/433; 137/596.14
(58) Field of Search .................. 91/433; 137/596.14, 137/625.6, 625.61

(56) References Cited

U.S. PATENT DOCUMENTS

| | | | |
|---|---|---|---|
| 2,913,005 | * | 11/1959 | Grant et al. ........................ 137/625.6 |
| 3,055,383 | * | 9/1962 | Paine .................................. 91/433 X |
| 4,015,619 | * | 4/1977 | Shore et al. ................... 137/625.6 X |
| 4,281,676 | * | 8/1981 | Morris ............................. 137/625.6 X |
| 4,469,011 | * | 9/1984 | Loffler ............................. 137/625.6 X |
| 4,535,809 | * | 8/1985 | Andersson ....................... 137/596.14 |
| 4,537,220 | * | 8/1985 | Anderson ..................... 137/596.14 X |
| 4,685,748 | * | 8/1987 | Zoerb ............................. 137/625.6 X |
| 5,042,832 | * | 8/1991 | Takahashi et al. .............. 137/625.64 |

FOREIGN PATENT DOCUMENTS 0314653 5/1989 (EP) .
1479692 7/1977 (GB) .

* cited by examiner

Primary Examiner—Gerald A. Michalsky
(74) Attorney, Agent, or Firm—Dinsmore & Shohl LLP (57) ABSTRACT

A hydraulic remote control (HRC) valve including a main spool valve and a pilot pressure control valve. A lever is operatively connected to the pilot valve whereby to provide "finger tip" control of the main spool valve. The HRC has an inverting output, whereby movement of the lever away from a neutral position causes a decrease in hydraulic pressure supplied to a hydraulic clutch. In practice, two HRC's according to the invention are embodied in a single housing. The HRC of the invention is of use in controlling the hydraulic steering clutches of tracked vehicles.

17 Claims, 7 Drawing Sheets

HYDRAULIC CONTROL MEANS

BACKGROUND OF THE INVENTION

This invention relates to hydraulic control means and more especially to a hydraulic remote control (HRC) valve. The invention has particular, but not exclusive, application to the control of hydraulic clutches employed on tracked vehicles such as earth-working equipment (bulldozers, etc) and military tanks.

As is well known, a tracked vehicle is steered by reducing or fully interrupting the drive to one or other of the two tracks, according to the change in direction required. This is achieved by reducing or interrupting the hydraulic supply to one or other of the clutches associated with tracks. Typically, this control of the hydraulic supply to the clutches is effected directly by the operation of levers acting on hydraulic valves but the torque involved is relatively high, thus requiring considerable manual effort on the part of the vehicle driver.

BRIEF SUMMARY OF THE INVENTION

There is a growing requirement for easing the effort required to operate tracked and other vehicles/machinery, especially having regard to the now recognised repetitive strain syndrome. The object of the present invention is to provide a hydraulic control valve requiring low-torque operation.

The present invention is defined in the appended claims and may provide a hydraulic control valve comprising a main hydraulic valve and a pilot pressure control valve operable manually to control the output of the main valve, the pilot valve being arranged such that when in operation the operating pressure of the pilot valve is increased, the output pressure of the main valve is decreased.

The pilot control valve may be, for example, a pressure-relief valve or a pressure-reducing valve and if the former, may be in the form of a poppet valve.

The operating pressure of the pressure-relief valve may be controlled by a manually-operable piston acting on a spring engaging the closure member of the poppet valve, the piston having a return spring, the rate of the return spring being such as to ensure that there is always a net force operable to urge the poppet valve to the open position.

The main valve may be a spool valve.

The output of the main valve may be fed back to the first end of the spool of that valve over a first portion of the overall cross-section of the spool, wherein pressure fluid controlled by the pilot valve is applied to a second portion of the overall cross-section of the spool at the first end, the forces generated by these pressures being balanced by a spring force acting on a second end of the spool.

A spring having a low, and substantially constant rate may act upon the second end of the spool of the main valve.

The pressure fluid may be applied to the first end of the spool of the main valve through restrictor means which may comprise two restrictors, one affecting the signal from the output, the other affecting the signal from the pilot valve.

In the application of the invention to the control of the two hydraulic clutches of a tracked vehicle, two control valves referred to above may be provided in a common housing and having independent controls. In view of the fact that in each control valve only a pilot valve is being manually controlled involving very small forces, mere finger-tip control has to be applied by the operator to the manually-operable means controlling that valve.

The present invention may also provide a method of controlling pressurised fluid comprising the steps of:

i) providing a main hydraulic valve;
ii) providing a pilot pressure control valve operable manually to control output of the main valve; and
iii) arranging the main valve such that an increase in the operating pressure of the pilot valve results in a decrease in the output pressure of the main valve.

The present invention may also provide a method of controlling hydraulic clutches associated with respective tracks of a tracked vehicle, comprising the steps of:

i) providing for each clutch a main hydraulic valve;
ii) providing for each main valve a pilot pressure control valve manually operable to control the associated main valve;
iii) providing independent manual controls for the pilot valves; and
iv) arranging the main valves such that an increase in the operating pressure of either pilot valve results in a decrease in the output pressure of the associated main valve.

This method may comprise the further step of providing the two main valves and two pilot valves in a common housing.

The step of providing a common housing may further comprise providing a block of material and drilling that block to provide valve bodies and fluid flow passages.

DETAILED DESCRIPTION OF THE INVENTION

Figure 1:
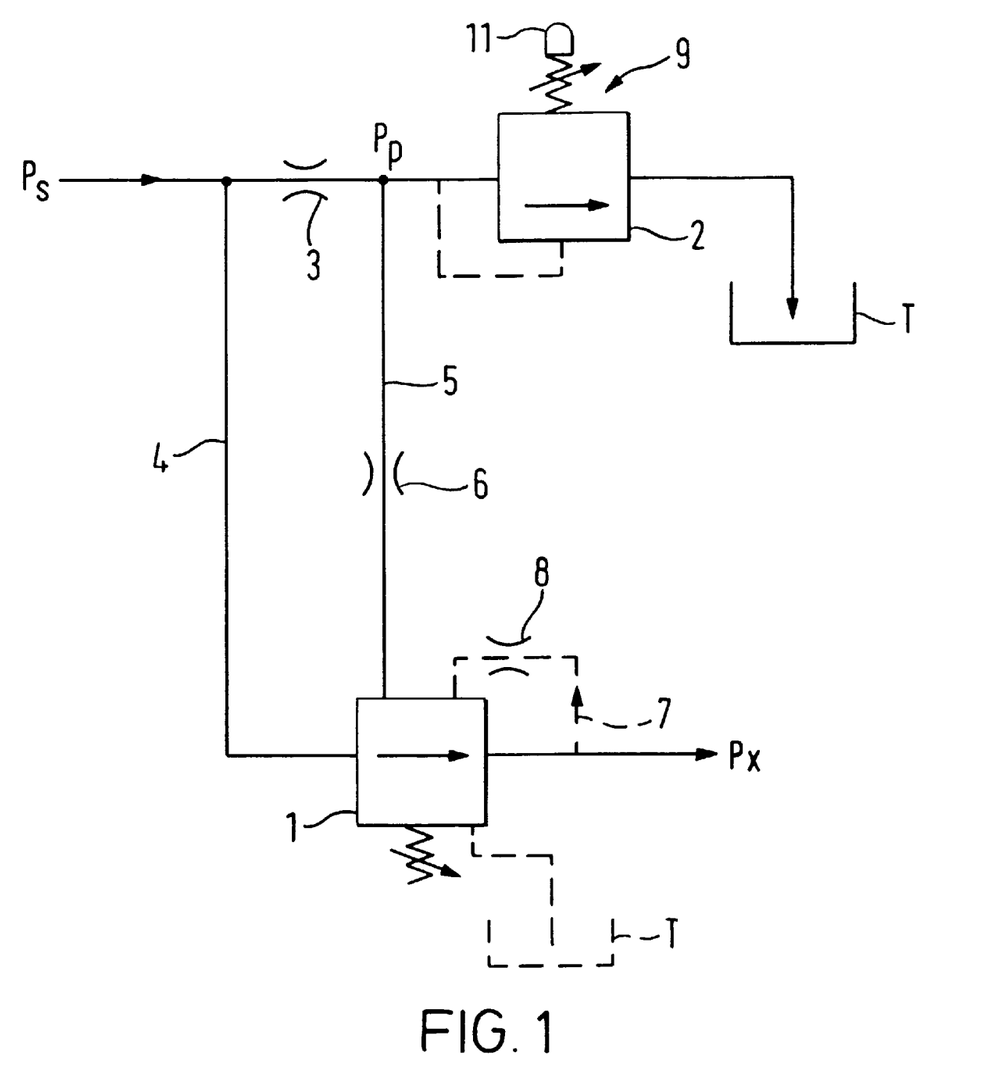
FIG. 1 is a hydraulic circuit diagram of part of the embodiment.

Referring first to FIG. 1, the preferred embodiment of HRC valve in accordance with the present invention comprises a remote supply Ps of pressurised hydraulic fluid, typically emanating from a hydraulic pump, and connected to both a main spool valve 1 and a pilot pressure control valve 2, the latter via a restrictor 3 to provide a pilot valve pressure supply Pp. The pilot valve 2 is in the form of a pressure-relief valve.

The supply pressure Ps is connected directly to the main valve 1 via a connection 4. The output pressure Px of the main valve 1 is supplied to a hydraulic clutch (not shown) associated with one track of the bulldozer (also not shown) and is also fed back via pipeline 7, through a restrictor 8, to the main valve 1.

Figure 2:
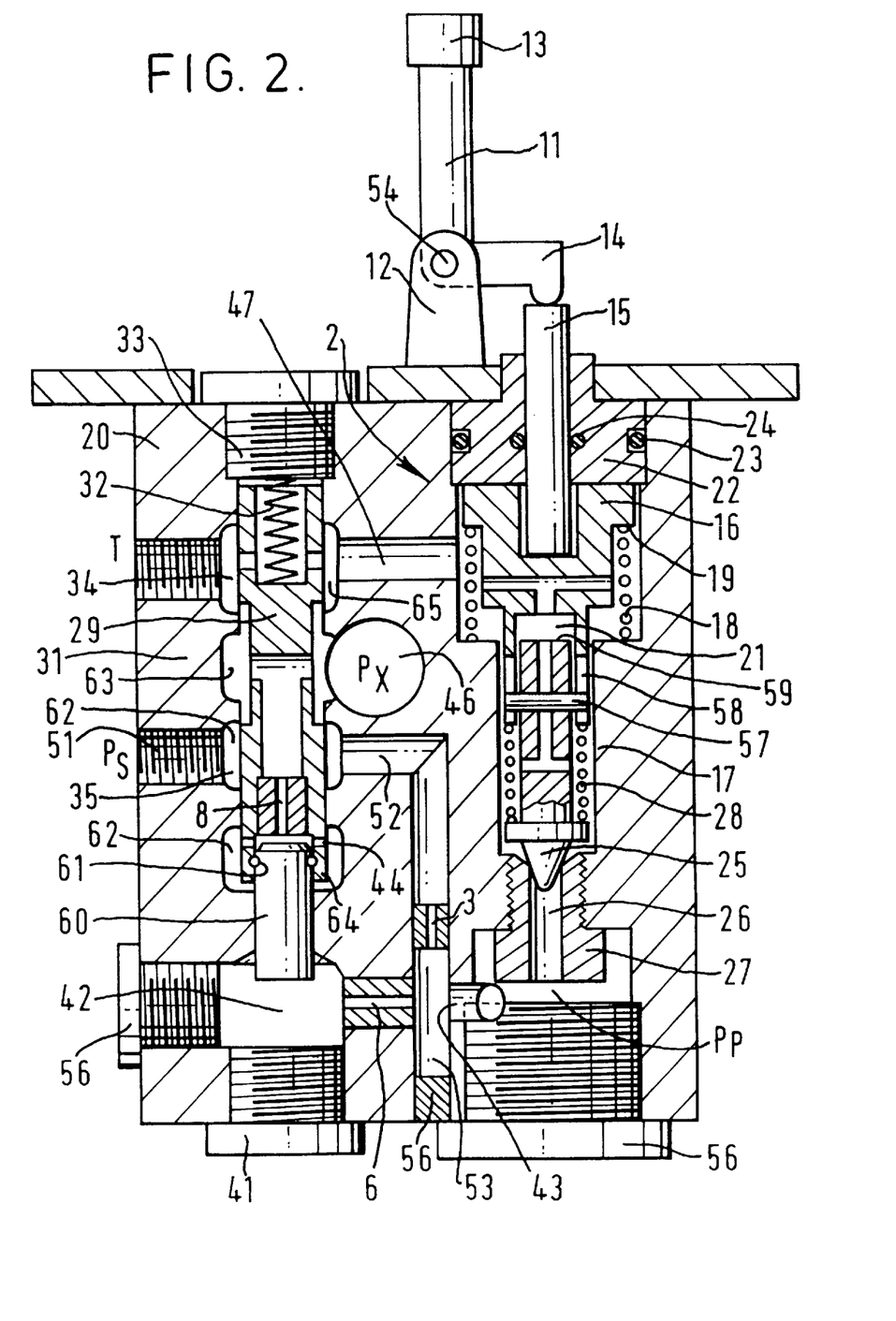
FIG. 2 is a schematic cross-section of part of the embodiment of FIG. 1.

The pilot valve 2 vents to tank T. The setting of the control pressure of the pilot valve 2 is controlled by a poppet valve 9 operated manually by the driver of the tracked vehicle via a lever 11 pivoted on a fulcrum 12 and having one end 13 engageable by the driver and the other end 14 engageable with a rod 15 of a spring guide 16 forming part of the pilot valve (FIG. 2). The control pressure is fed to the main valve 1 via a connection 5 embodying a restrictor 6.

Looking now at FIG. 2, this shows a practical embodiment of the circuit of FIG. 1 and it can be seen that the pilot valve 2 has a body 17, formed by a drilling in a block of material 20, in which the spring guide 16 is slidably mounted, the spring guide being provided with a return spring 18 engaging at one end an annulus 19 on the guide. The guide 16 also has a central recess 21.

One end of the pilot valve body 17 is sealed by a plug 22 and sealing ring 23, the plug having a central through bore through which the rod 15 acts against the guide 16. The rod 15 is sealed in the plug through bore by a sealing ring 24.

The poppet valve 9 has a poppet 25 engageable with an aperture 26 provided in a closure 27 for the other end of the valve body 17. The poppet 25 is urged into sealing engagement with the aperture 26 by a spring 28, the rates of this spring and the return spring 18 being such that there is always a net force acting on the poppet 25 to urge it into engagement with the aperture 26, during operation of the valve.

When no load is applied via the lever 11, the return spring 18 urges the spring guide 16 upwards against the plug 22. In the "rest" position of the poppet valve 9, the downward movement of the poppet 25 is limited by a pin 57 movable in a slot 58 provided in the guide 16. In this rest position, poppet 25 is not urged into a sealing engagement with the aperture 26. In this way, fluid can flow freely past the poppet 25 and no pressure is generated by the poppet valve 9.

Downward loading of the spring guide 16 by movement of the lever 11 allows the pin 57 to move away from the end of the slot 57, thus allowing the poppet 25 to be urged against aperture 26 by the spring 28, ie. urged into a "valve-closed" position.

After a certain further downward movement of guide 16, the top surface of the recess 21 makes contact with a top face 59 of the poppet 25. In this position, the force urging the poppet 25 against the aperture 26 is not controlled by 28 but instead by the force applied to the end 13 of the lever 11. In this way the fluid pressure Pp generated by the poppet valve 9 can be raised to the limiting supply pressure Ps.

Figure 8:
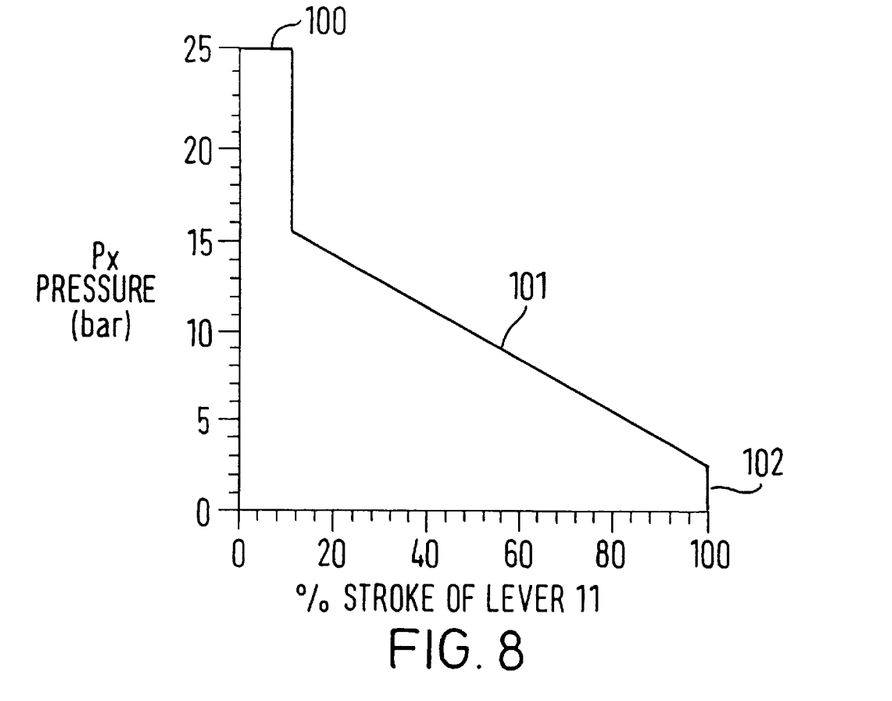
FIGS. 8 and 9 are explanatory graphs of operation of the illustrated embodiment and an alternative embodiment, respectively.

The above modes of operation of poppet valve 9 allow the outlet pressure characteristic shown in FIG. 8 to have three corresponding modes 100,101,102.

Figure 9:
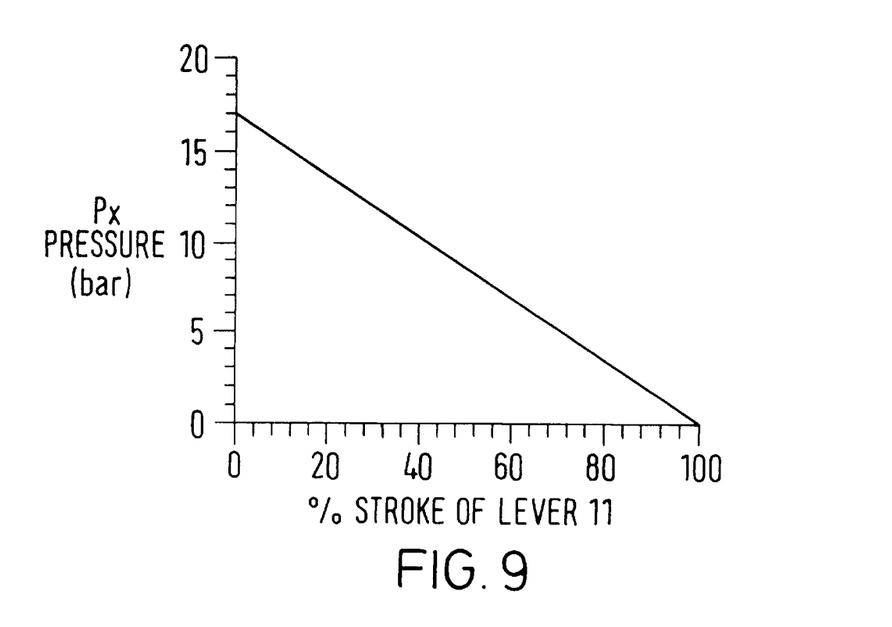

The poppet valve arrangement may be simplified if only a single mode, linear pressure characteristic is required as illustrated in FIG. 9.

Still referring to FIG. 2, the main valve 1 comprises a spool 29 slidably mounted in a body 31, formed by a drilling in the block 20, and having a spring 32 acting between one (second) end and a plug 33 closing one end of the body. The spring 32 has a low, and as constant as possible, rate. The spool 29 is provided with two lands 34 and 35. A piston 60 is located in the end of the spool 29 opposite that acted upon by the return spring 32. The piston 60 is held engaged in the spool 29 by a circlip 61. The separate spool 29 and piston 60 may be replaced by a one-part component.

The end of the main valve body 31 opposite that closed by the plug 33 has a reduced diameter and is closed by a plug 41. There is a gallery 42 between the end of the piston 60 and the plug 41, which gallery connects with the poppet valve 9 via the restrictor 6 and drilling 43. The output pressure Px of the main valve is supplied via restrictor 8 and drilling 44, to a gallery 62 in the valve body 31.

An output port 46 is provided in the block 20 for attachment of a pipeline (not shown) leading to the clutch. A drilling 47 in the block 20 connects respective ends of the valve bodies 17 and 31 to tank T.

Supply pressure Ps is supplied to the block 20 via a pressure or input port 51, the supply being taken to both the main valve spool 29 via a gallery 63 and to the poppet valve 9 via the drilling 52 and 53, restrictor 3 and further drilling 43.

It will be appreciated that in order to drill the block 20, to provide the various valve bodies and drillings referred to above, access drillings have to be provided which, after manufacture, are closed by plugs 56.

The piston rod 15 of the relief valve 2 is acted upon by the end 14 of the lever 11, which is L-shaped and pivotally attached at 54 to the fulcrum 12 supported on the block 20.

Figure 3:
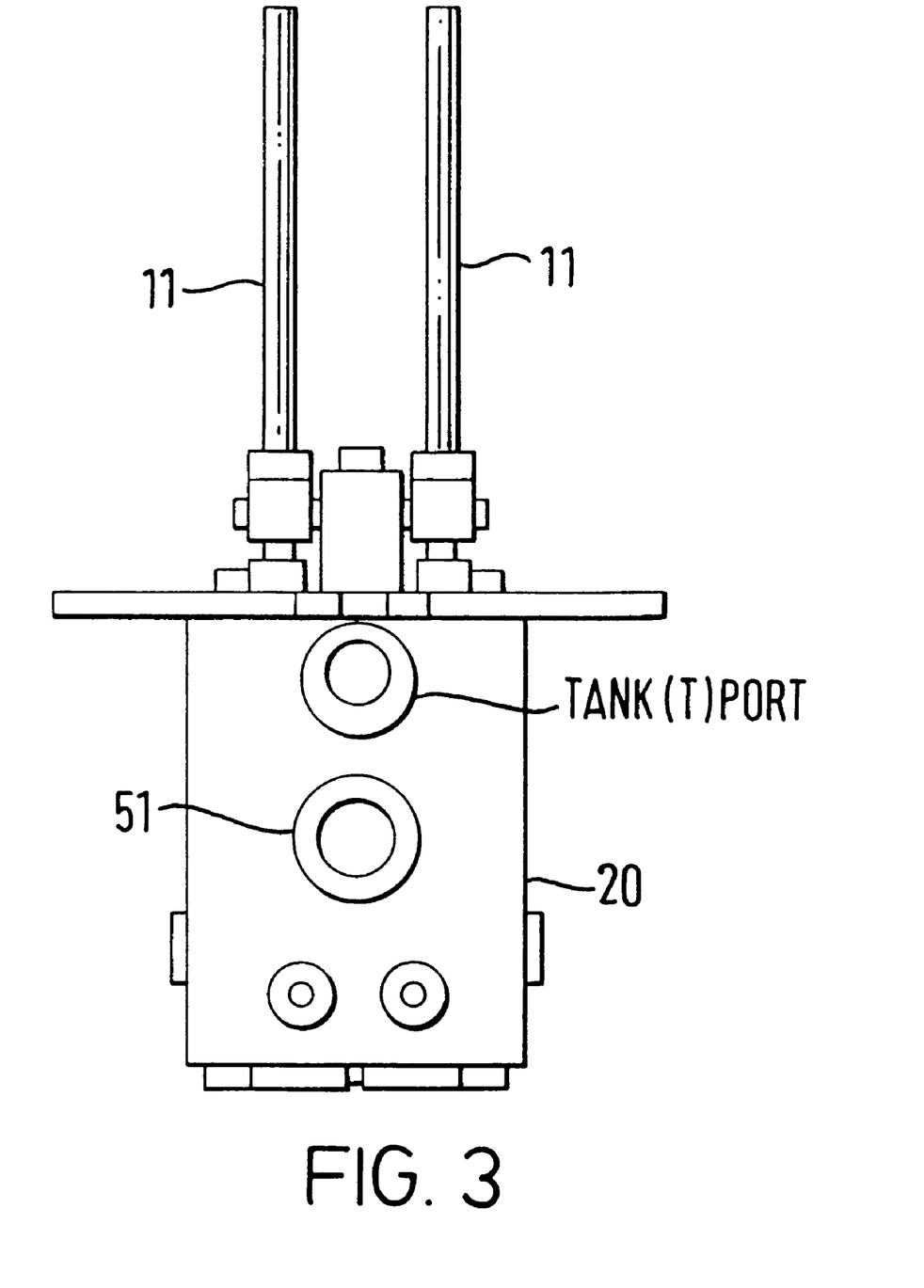
FIG. 3 is one side elevation of the whole of the first embodiment.
Figure 4:
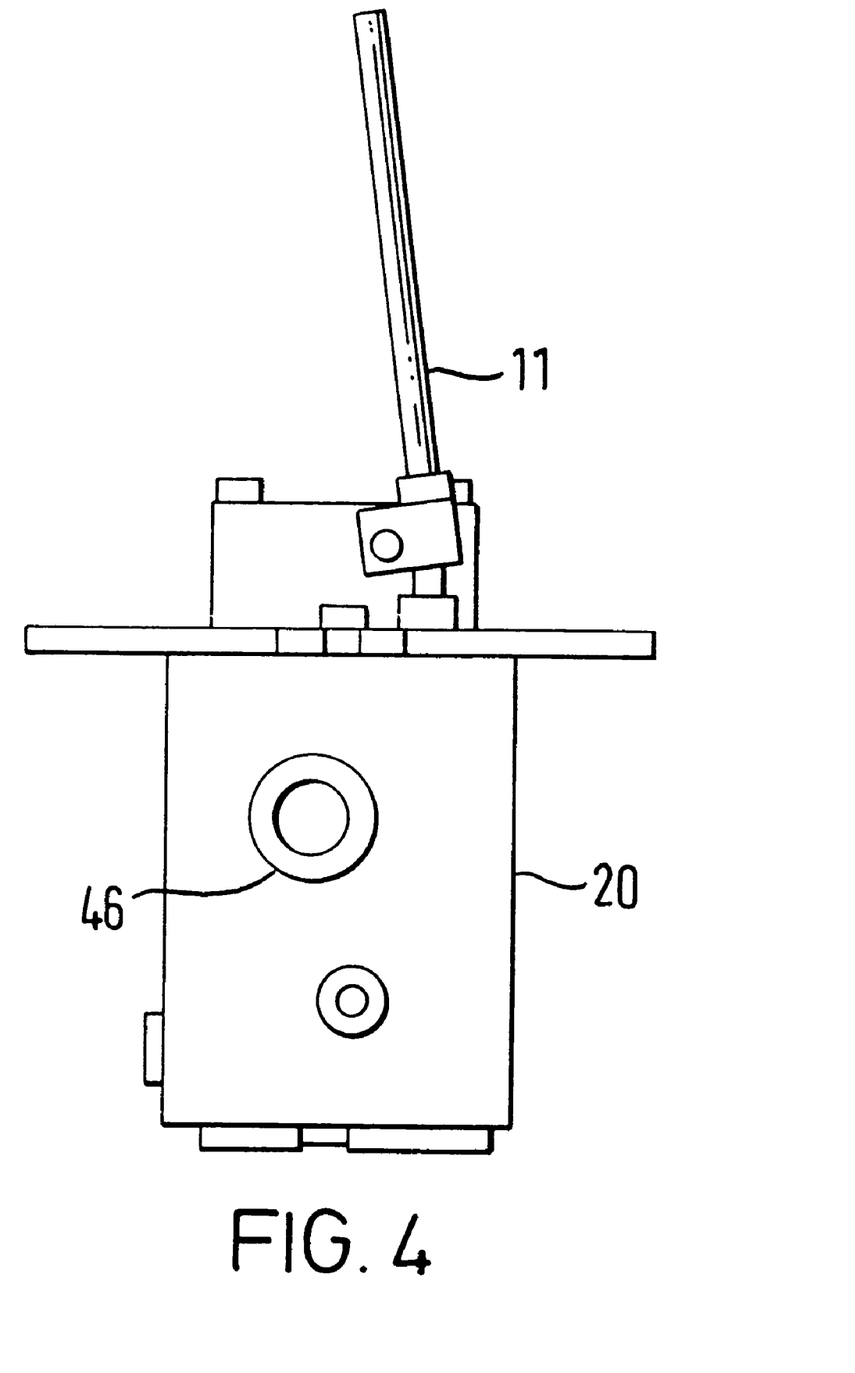
FIG. 4 is a second side elevation of the whole of the first embodiment.
Figure 5:
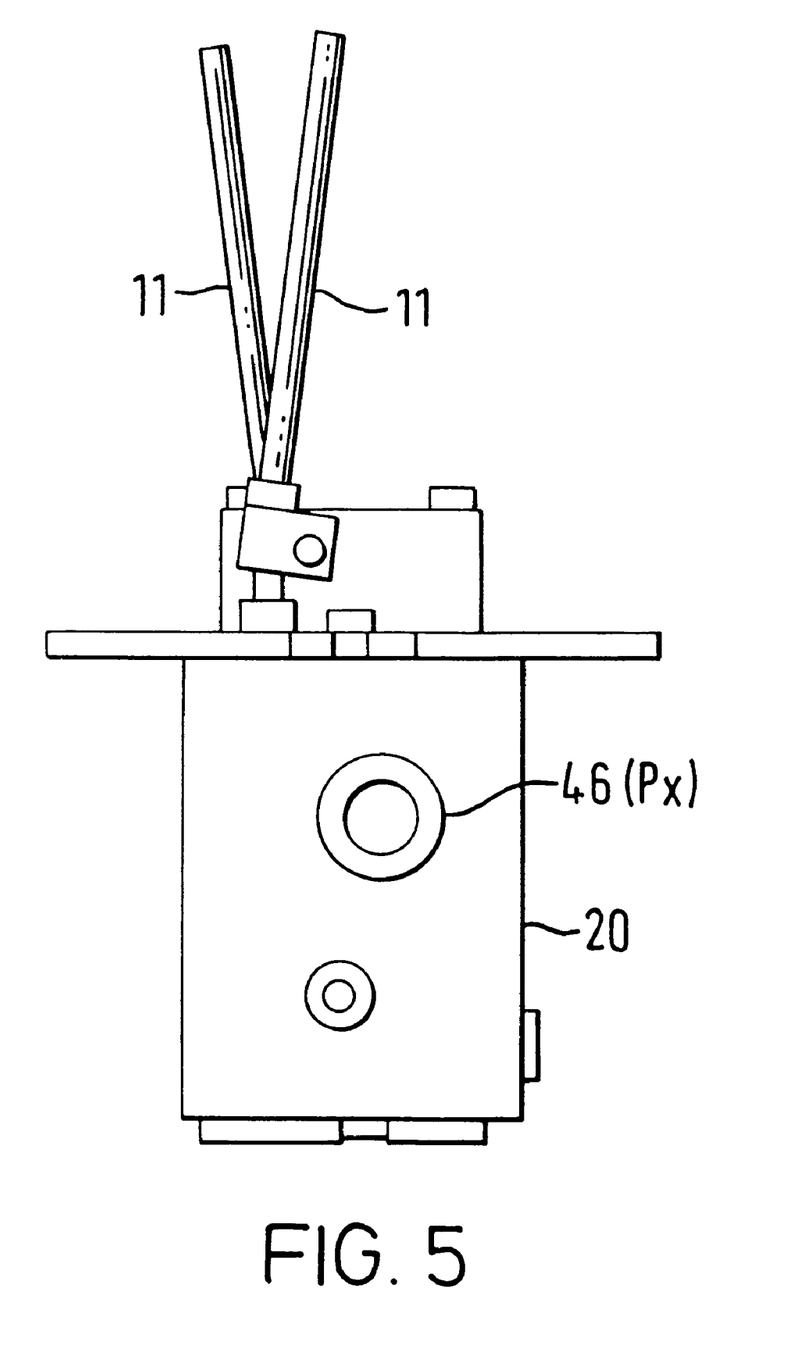
FIG. 5 is a fourth side elevation of the whole of the embodiment.
Figure 6:
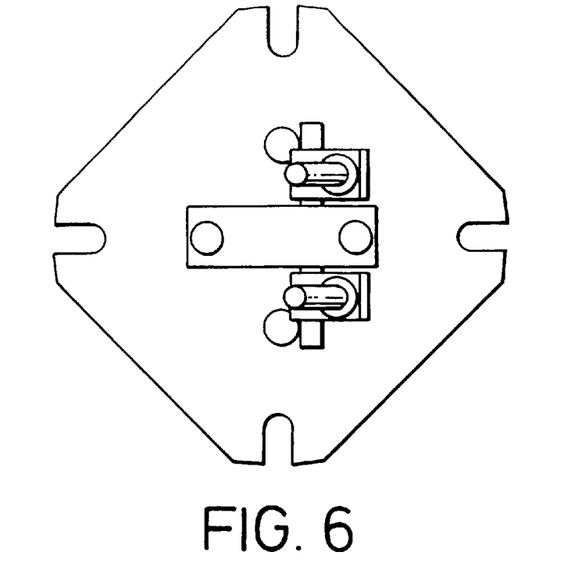
FIG. 6 is a plan view from above of FIG. 4.
Figure 7:
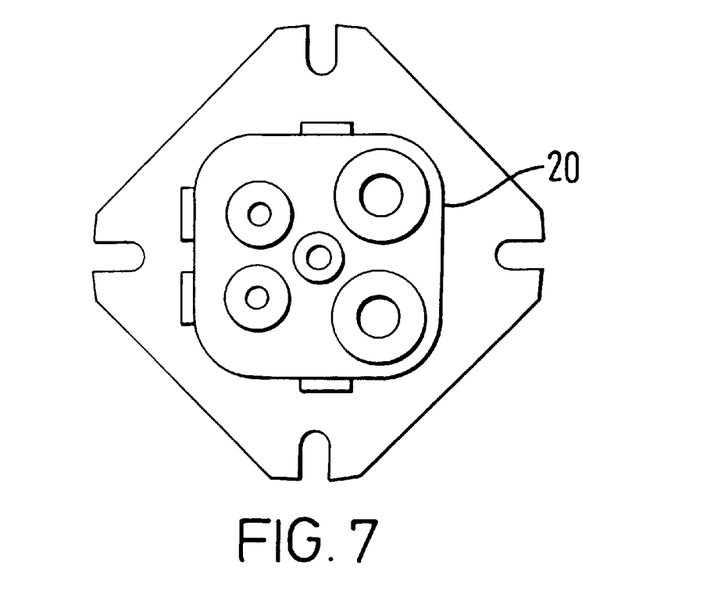
FIG. 7 is a plan view from below of FIG. 4.

The block 20 contains two of the hydraulic circuits shown in FIGS. 1 and 2, one for each of the two clutches associated with the right- and left-hand tracks of the vehicle. The two operating levers 11 are seen in FIGS. 3 to 5.

In operation, the lever 11 is normally in the rest position shown in FIG. 2 in which supply pressure Ps is fully supplied as the output Px to both clutches, via the galleries 62 and 63 around the main valve spool 29. This output pressure Px is also supplied via drilling 44 and restrictor 8 to a first end 64 of the main valve spool 29 opposite the second end.

The supply pressure Ps which is supplied to the poppet valve 9 via the drillings 53 and 55 via the restrictor 3 is vented to tank T.

When it is required to steer the tracked vehicle, differential drive to the tracks is required, whereby one clutch has to be partially or fully declutched. The driver pivots the associated lever 11 about the pivot 52 by moving the lever end 13 to the right as seen in FIG. 2. As already explained above, this action moves the lever end 14 downwardly and eventually moves the rod 15 and spring guide 16 downwardly. This movement compresses spring 28 and hence increases the closing force on the poppet 25. This in turn means an increase in the pressure Pp which is fed to gallery 42 and acts on the piston 60. This tends to move the spool 29 against the spring 32 and thus vents Px via an output gallery 65, and hence the associated clutch is de-pressurised to a certain extent, thereby reducing the drive to the associated track. This reduced Px is of course fed back to the first end of the spool 29 to maintain its balance, the balance of total pressure force acting on one end of the spool 29 against the force of the spring 32 acting on the other end. The spool position modulates to maintain this balance.

Clearly, the more the lever 11 is rotated, the greater the reduction in output pressure Px and the greater the de-clutching of the clutch in question. In other words, the greater the torque applied to the lever 11, the greater the reduction in output pressure Px. Put another way, the clutch control circuit achieves an inverse modulation output.

This is illustrated, as already mentioned, in FIG. 8 which is a graph of the pressure ports 46 (Px) of the two circuits against the movement (stroke) of the levers 11.

In as much as the driver only has to control the operating force on the poppet valve 9, extremely low torque is involved allowing mere finger-tip control which is an important advance in the art.

The annulus formed at the first end 64 of the spool by the land 35 and reduced diameter portion 60 of the main valve spool 29 is typically 50% of the overall spool cross-sectional area, and the end of that spool formed in effect by the piston 60 is also typically 50% of the overall spool cross-sectional area but other percentages, ideally adding up to 100%, may be employed ideally totalling approximately 100% of the cross-sectional area.

Although in the illustrated embodiment the output pressure Px acts on an outer (annulus) part of the first end 64 of the spool 29, with the relief valve pressure Pp acting on inner part (piston 60), this may be reversed.

The supply pressure Ps is typically 25 bar and the diameter of the aperture 26 of the poppet valve 9 may be 2.5 mm.

What is claimed is:

1. A hydraulic control device comprising:
    a main hydraulic valve adapted to provide a hydraulic output pressure;
    a pilot pressure control valve in fluid communication with the main hydraulic valve and configured to control the output pressure of the main valve such that an increase in operating pressure of the pilot valve causes a decrease in the output pressure of the main valve, wherein the pilot valve includes a closure member;
    a biasing member engaging the closure member of the pilot valve;
    a manually operable member movable to at least three positions to vary the operating pressure to at least three levels and thereby inversely control the output pressure of the main valve between at least three corresponding levels, wherein said inverse control is provided by the manually operable member acting on the biasing member;
    wherein the operating pressure of the pilot valve is controlled by the manually operable member imparting movement to the pilot valve;
    wherein the pilot valve and manually operable member are configured such that, when the manually operable member is in a rest position in the absence of manual control, a net force urges the pilot valve to an open position so as to allow fluid to flow freely past the pilot valve to thereby create minimum operating pressure of the pilot valve and maximum output pressure of the main valve; and
    wherein manual movement of the manually operable member away from the rest position imparts movement to the pilot valve toward a closed position to thereby increase the operating pressure of the pilot valve and decrease the output pressure of the main valve.

2. A device according to claim 1, wherein the pilot valve is a pressure-relief valve.

3. A device according to claim 2, wherein the pressure relief valve is a poppet valve.

4. A device according to claim 1, wherein:
    the pilot valve is a poppet pressure-relief valve;
    wherein the biasing member comprises a valve spring and the manually operable member comprises a return spring, and wherein the valve spring and the return spring are adapted to generate the net force.

5. A device according to claim 1, wherein the main valve is a spool valve.

6. A device according to claim 5, wherein the spool valve includes a spool having a first end, and pressure fluid is applied to the first end of the spool through a restrictor.

7. A device according to claim 1, wherein:
    the main valve is a spool valve; and
    the output of the main valve is fed back to a first end of the spool of that valve over a first portion of the overall cross-section of the spool, wherein pressure fluid controlled by the pilot valve is applied to a second portion of the overall cross-section of the spool, at the first end, the force generated by these pressures being balanced by a spring force acting on a second end of the spool.

8. A device according to claim 1, wherein:
    the main valve is a spool valve;
    the output of the main valve is fed back to a first end of the spool of that valve over a first portion of the overall cross-section of the spool, wherein pressure fluid controlled by the pilot valve is applied to a second portion of the overall cross-section of the spool, at the first end, the force generated by these pressures being balanced by a spring force acting on a second end of the spool; and
    said first and second portions of the overall cross-section of the spool are each 50%.

9. A device according to claim 1, wherein:
    the main valve is a spool valve;
    the output of the main valve is fed back to a first end of the spool of that valve over a first portion of the overall cross-section of the spool, wherein pressure fluid controlled by the pilot valve is applied to a second portion of the overall cross-section of the spool, at the first end, the force generated by these pressures being balanced by a spring force acting on a second end of the spool; and
    said first and second portions of the overall cross-section of the spool are different from one another and total approximately 100% of the cross-section.

10. A device according to claim 1, wherein:
    the main valve is a spool valve;
    the output of the main valve is fed back to a first end of the spool of that valve over a first portion of the overall cross-section of the spool, wherein pressure fluid controlled by the pilot valve is applied to a second portion of the overall cross-section of the spool, at the first end, the force generated by these pressures being balanced by a spring force acting on a second end of the spool; and
    a spring having a substantially constant rate acts upon the second end of the spool of the main valve.

11. A device according to claim 10, wherein the substantially constant rate spring has a relatively low rate.

12. Hydraulic control means for the hydraulic clutches of a tracked vehicle, comprising two hydraulic control devices according to claim 1 mounted in a common housing.

13. Control means according to claim 12, wherein the housing is a block of material drilled to provide fluid flow passages.

14. A hydraulic control device comprising:
    a main hydraulic valve adapted to provide a hydraulic output pressure;
    a pilot pressure control valve in fluid communication with the main hydraulic valve and configured to control the output pressure of the main valve such that an increase in operating pressure of the pilot valve causes a decrease in the output pressure of the main valve;
    a manually operable member movable to at least three positions to vary the operating pressure to at least three levels and thereby inversely control the output pressure of the main valve between at least three corresponding levels;
    wherein the pilot valve comprises a poppet pressure-relief valve; and wherein the operating pressure of the poppet pressure-relief valve is controlled by the manually-operable member acting on a valve spring engaging a closure member of the poppet pressure-relief valve, wherein the member comprises a return spring, and wherein the valve spring and the return spring are adapted such that a net force urges the poppet pressure-relief valve to an open position in the absence of manual control.

15. A hydraulic control device comprising:

a main hydraulic valve adapted to provide a hydraulic output pressure;

a pilot pressure control valve in fluid communication with the main hydraulic valve and configured to control the output pressure of the main valve such that an increase in operating pressure of the pilot valve causes a decrease in the output pressure of the main valve;

a manually operable member movable to at least three positions to vary the operating pressure to at least three levels and thereby inversely control the output pressure of the main valve between at least three corresponding levels;

wherein the main valve comprises a spool valve; and wherein the output of the main valve is fed back to a first end of the spool of that valve over a first portion of the overall cross-section of the spool, wherein pressure fluid controlled by the pilot valve is applied to a second portion of the overall cross-section of the spool, at the first end, the force generated by these pressures being balanced by a spring force acting on a second end of the spool.

16. The device as recited in claim 15, wherein the first and second portions of the overall cross-section of the spool total approximately 100% of the total cross-section.

17. The device as recited in claim 15, further comprising:

a spring having a substantially constant rate acting upon the second end of the spool of the main valve.

* * * * *